United States Patent [15] 3,713,039

Hashimoto [45] Jan. 23, 1973

[54] TELEPHONE ANSWERING AND RECORDING DEVICE

[72] Inventor: Kazuo Hashimoto, 28-2, 2-chome Komazawa, setagaya-ku, Tokyo, Japan

[22] Filed: Sept. 14, 1970

[21] Appl. No.: 71,645

[52] U.S. Cl. ....................179/6 R
[51] Int. Cl. ....................H04m 1/64
[58] Field of Search.........179/6 R, 6 AC, 6 C, 100.2; 226/108 T

[56] References Cited

UNITED STATES PATENTS

| | | | |
|---|---|---|---|
| 2,666,813 | 1/1954 | Camras | 179/100.2 E |
| 3,127,474 | 3/1964 | Waldman | 179/6 R |
| 3,293,365 | 12/1966 | Mitsui | 179/6 R |
| 3,310,629 | 3/1967 | Yamamoto | 179/6 R |
| 3,376,390 | 4/1968 | Hashimoto | 179/6 AC |
| 3,445,600 | 5/1969 | Todd | 179/6 R |
| 3,519,762 | 7/1970 | Morris | 179/100.2 E |
| 3,527,893 | 9/1970 | Honobe | 179/6 AC |

*Primary Examiner*—Bernard Konick
*Assistant Examiner*—Raymond F. Cardillo, Jr.

[57] ABSTRACT

Disclosed herein is an automatic telephone answering and recording device characterized by a novel and simplified mechanism wherein a single capstan and a single pinch roller are provided through which both the outgoing and incoming magnetic tapes transport, whereby the transport time of the incoming magnetic tape is controlled by one cycle of the outgoing magnetic tape, and a sign off message can be pre-recorded near the end of the outgoing magnetic tape.

7 Claims, 5 Drawing Figures

INVENTOR.

Kazuo Hashimoto

INVENTOR.
Kazuo Hashimoto

*INVENTOR.*

Kazuo Hashimoto

TELEPHONE ANSWERING AND RECORDING DEVICE

This invention relates to an automatic telephone answering and recording device, more particularly, to a novel and simplified telephone answering device wherein a single capstan and a single pinch roller are provided.

Many devices for automatic telephone answering and recording a calling party are known. Some of them include various complex and expensive means, so they are unsuitable for the general public. This invention provides a practical automatic telephone answering device which is so inexpensive that every family or household can afford to have it installed.

In the automatic telephone answering and recording device of the prior art, it is common for the calling party to experience as follows: in response to a telephone calling signal, the device talks, " . . . please talk about 30 seconds after the beep tone . . . ", then the silent period follows, and the telephone hangs up after a predetermined period, say, about 30 seconds. If the calling party experiences this when he meets the device for the first time, he feels uneasy. However, the device of this invention, various kinds of the answering message are given encouragingly to the calling party as described in detail hereinafter, hence any one who is not accustomed to it can talk easily a message to be recorded.

In addition, the device can prerecord a background music or beep tone every 10 seconds by actuating a built-in switch immediately after the above answering message on the whole length of the magnetic tape. Therefore the calling party can listen to the background music or beep tone every 10 seconds in place of the silent period of the device of the prior art so that he can confirm the working condition of the device.

In accordance with a preferred embodiment of this invention, the automatic telephone answering device of this invention can transport both an outgoing magnetic tape and an incoming magnetic tape in a laminated form so that the transport of the incoming magnetic tape can be effectively controlled by one cycle of the outgoing magnetic tape. As compared with the telephone answering device of the prior art provided with many relays and switches therefor, the device of this invention is characterized by a very simple construction. In the conventional device, an additional relay for switching the outgoing magnetic tape and the incoming magnetic tape is required so that a complex mechanism is also necessary to handle the end of each magnetic tape. However, in the device of this invention, a number of relays is saved by the use of two amplifiers, and both the outgoing magnetic tape and the incoming magnetic tape are at all times with a single capstan and a single pinch roller in the transport of the magnetic tape, hence the whole assembly has been simplified to the utmost. In reference to the provision of two amplifiers, it may be interpreted that the provision of two relays makes almost no difference. As it is known nowadays that the amplifying circuit of this kind is assembled as of an integrated circuit, the use of the same two parts is favorable for mass production. Thus the automatic telephone answering device constructed in accordance with the principle of the invention can attain a much stabler operation as well as a much less expensive price which is half to one-third than that of the device of a similar kind having a complex switching means by an increased number of contacts due to the use of two relays. While the telephone answering device of this invention is characterized in that it is never inferior to any of expensive ones the same kind of the prior art in operation and function, its price is so exceedingly low that every family can afford to obtain it.

Accordingly, it is an object of the invention to provide a novel telephone answering device wherein the transport of an outgoing magnetic tape as well as an incoming magnetic tape is done by a single capstan and a single pinch roller, and the transport of the incoming magnetic tape is controlled by one cycle of the outgoing magnetic tape so that a novel effect heretofore undeveloped can be realized.

It is another object of the invention to provide an automatic telephone answering and recording device wherein the recordation of an answering message on the outgoing magnetic tape can be carried out only one time while both the outgoing and incoming magnetic tapes are simultaneously transported.

It is still another object to provide an automatic telephone answering device wherein no slip whatever takes place in the simultaneous transport of the outgoing and incoming tapes by the common transport mechanism.

Other objects and advantages of the invention will be apparent from the following specification and the accompanying drawings, which are for the purpose of illustration only, and in which.

Figure 1:
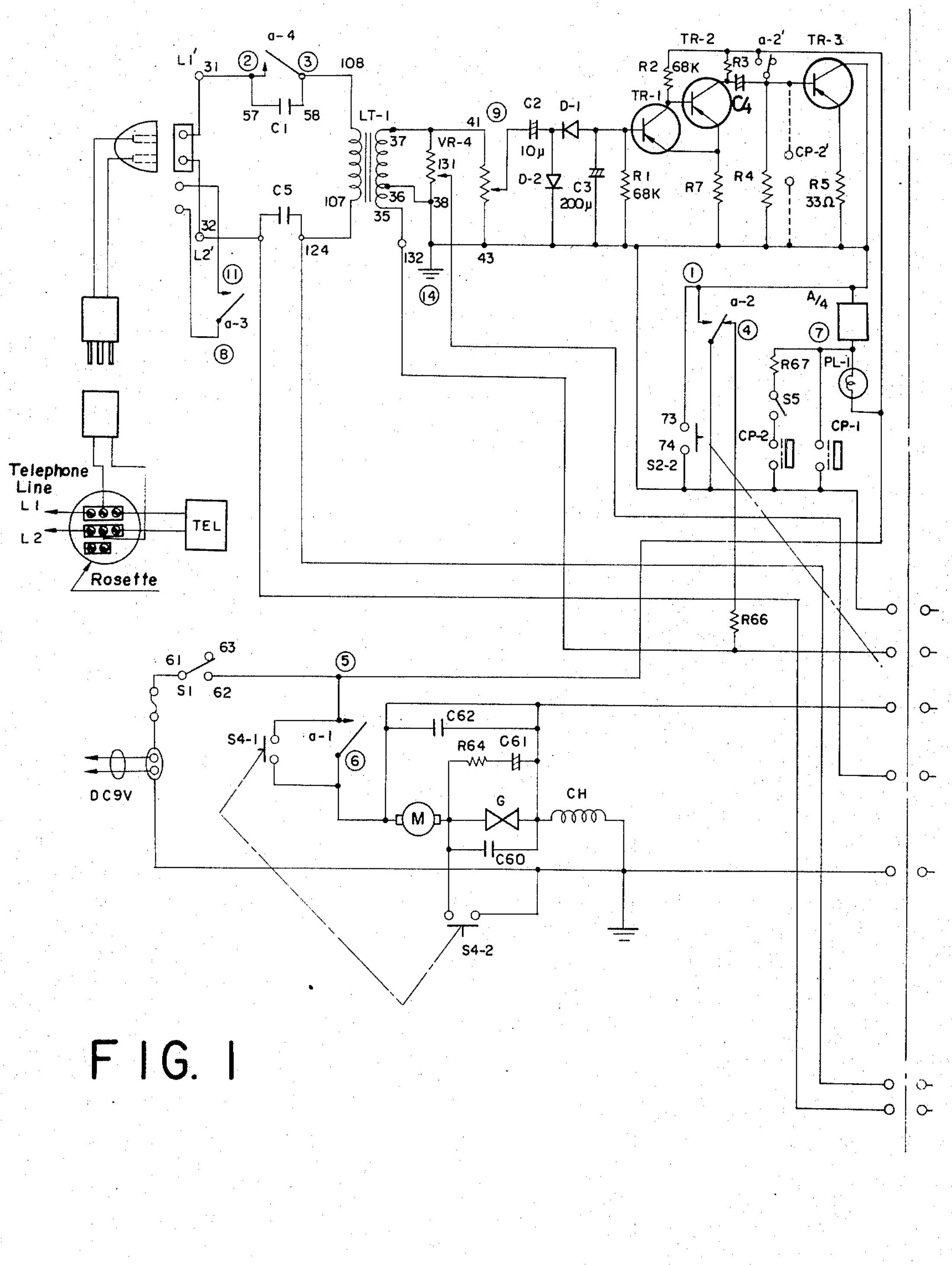
FIG. 1 is a schematic circuit diagram of the device of the invention.
Figure 2:
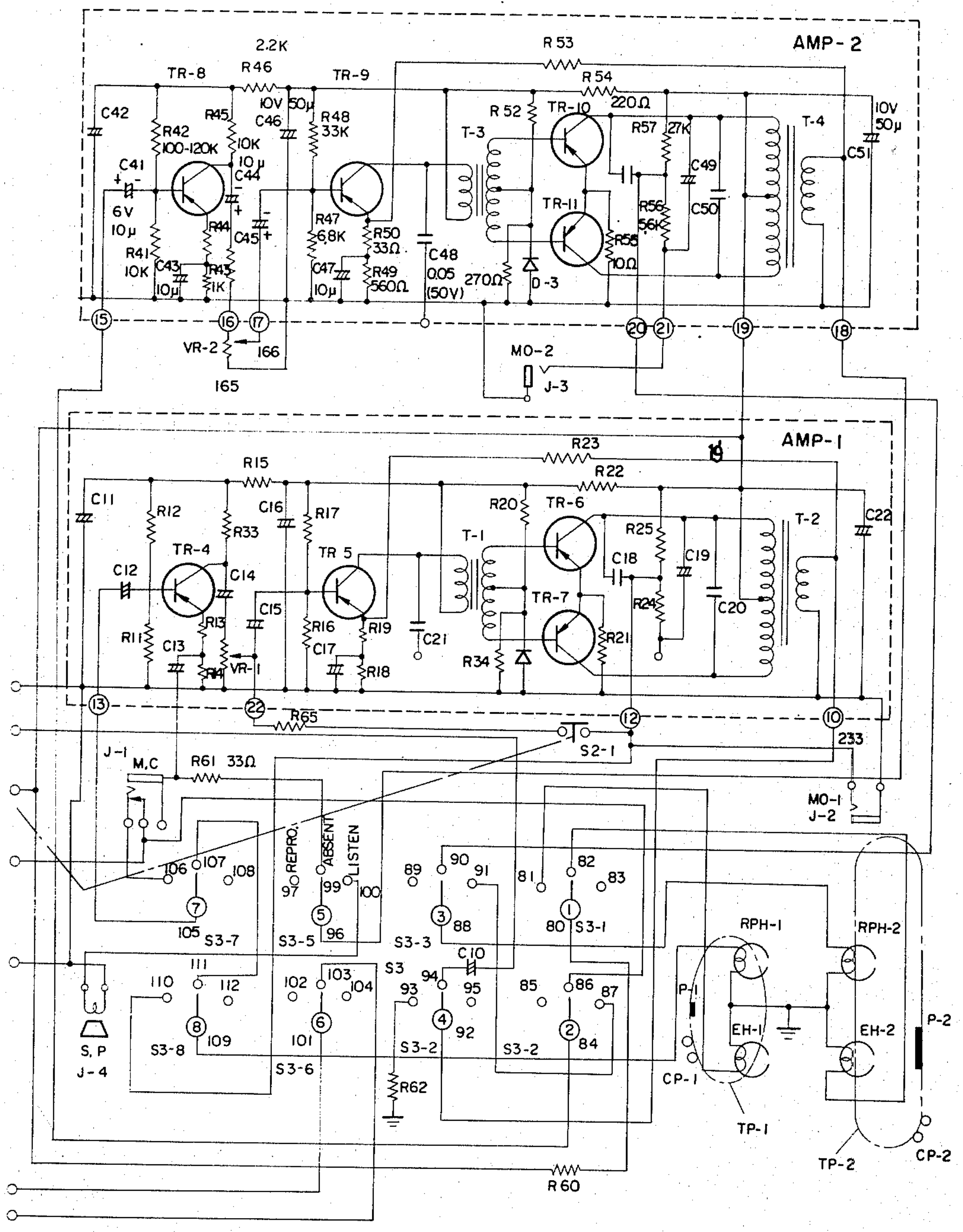
FIG. 2 is another schematic circuit diagram connected to the circuit diagram of FIG. 1.

In FIGS. 1 – 2, there are shown telephone lines $L_1$ and $L_2$, a telephone set TEL, a relay A, its contacts *a*–1, *a*–2, *a*–3 and *a*–4, an input transformer LT–1 provided with a plurality of windings, for example, primary, secondary, and tertiary ones, variable resistors VR–1 to VR–4, resistors $R_1$ to $R_{64}$, capacitors $C_1$ to $C_{64}$, and transistors TR–1 to TR–11. An electric source switch $S_1$ consists of a two-gang seesaw switch $S_{1-1}$ and $S_{1-2}$. A pushbutton switch $S_2$ of two gangs $S_{2-1}$ and $S_{2-2}$ functions contact-and-break at one action. A rotary switch $S_3$ consists of 8-circuit, each circuit has three positions: left for recording an outgoing message, middle for absent, and right for listening when a telephone subscriber returns home. It is so made that it is operatively connected simultaneously by a knob. A pushbutton switch $S_4$ manually energizes a motor, and it is in parallel connected to the relay contact *a*–1 which will be described later.

A jack J–1 is used for a microphone MC, a jack J–2 for monitoring an amplifier AMP–1, a jack J–3 for monitoring an amplifier AMP–2, and a jack J–4 for a speaker. The amplifier AMP–1 is used for the outgoing magnetic tape while the amplifier AMP–2 for the incoming magnetic tape. Each amplifier consists of four-transistor circuit as shown in FIG. 2, the direct current of which is supplied from a terminal 6 of contact a–1 to terminals 19, 19'.

In FIG. 1 there are shown a micro-motor M energized by direct current (D.C.), a governor G, and a choke coil CH. The electric current of the device uses D.C. from a dry cell or similar D.C. source, for example, a transformer. The reason why the dry cell is used in the device of the invention lies in the fact that when a household is absent, the commercial electric current is usually interrupted for the sake of safety, such as, fire.

Figure 3:
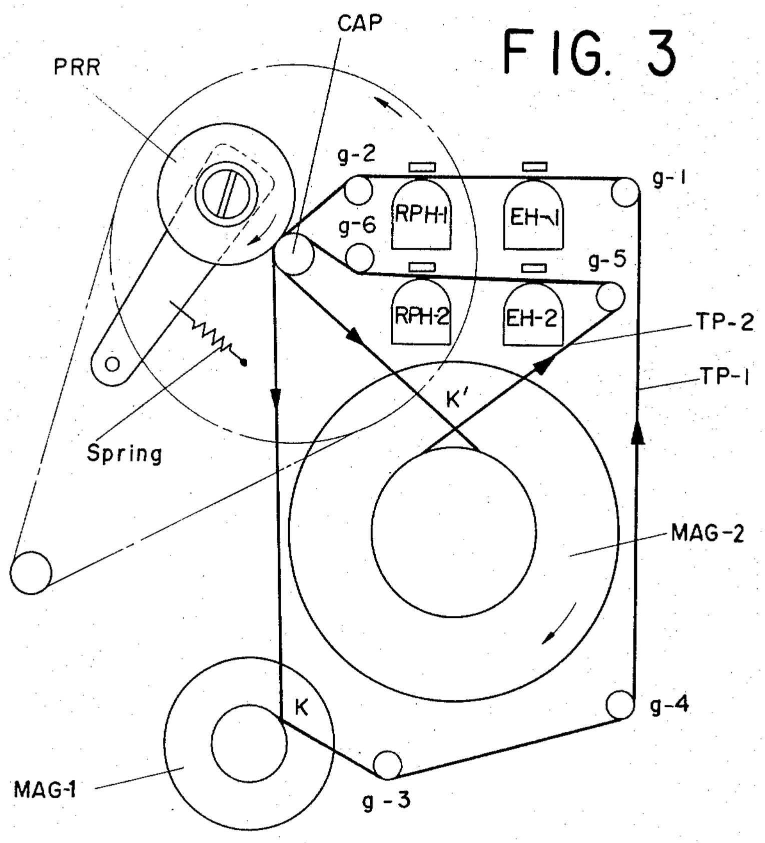
FIG. 3 is a top plan showing the mechanism of the invention.
Figure 4:
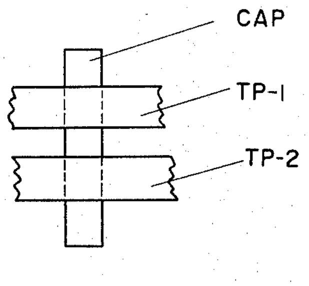

In reference to a tape deck in FIG. 3, there are an outgoing magnetic tape TP–1 and an incoming magnetic tape TP–2. As shown in FIG. 3, the tapes are simultaneously transported by a single motor and disposed between the capstan CAP and the pinch roller PRR, which is at all times pressed to the capstan by a spring as shown. It is arranged that the tape deck is accommodated within the smallest space with a simple mechanism. It is rather difficult to show how two tapes are disposed between the capstan and the pinch roller in a plan view. Two tapes may be disposed as being entirely laminated, or as being side by side longitudinally up and down as shown in FIG. 4. In the former example, the thickness of two tapes corresponds to the sum of two tapes while in the latter the thickness equals to that of a single one.

Hence, if the magnetic tape TP–1 is different from the one TP–2 in thickness, it follows that the pressing contact between the capstan and the pinch roller is uneven, therefore it is disadvantageous. However, in the former example where two tapes are laminated, the material of one tape may be different from that of the other, therefore the relative slip between two tapes can be prevented by the use of the material having a high coefficient of friction as well as a small slip.

Figure 5:
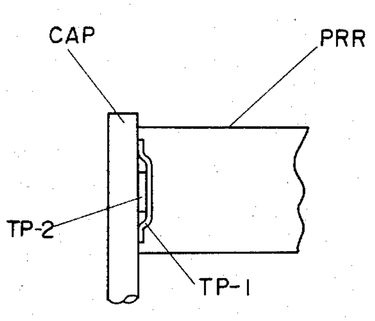
FIGS. 4 – 5 show a modified embodiment showing the portion of the mechanism of FIG. 3 wherein two tapes are transported.

As shown in FIG. 5, the width of the inner tape or the tape TP–2 is made narrow while that of the outer tape or the tape TP–1 wide when they are pressed between the capstan and the pinch roller, the pressing effect will be assured more effectively, because the upper and lower edges of the pinch roller are so deformed due to its rubber elasticity that they tend to press the upper and lower edges of the outer tape TP–1 toward the capstan.

In accordance with the invention, the tape TP–2 follows a particular threading way by a particular transport method. As shown in FIG. 3, in the transport path of the magnetic tape TP–2 released from an endless tape reel and introduced to the capstan CAP through a guide pole g–5, an erase head EH–2, a recording and reproducing head RPH–2 and a guide pole g–6, it is clearly seen that the magnetic tape TP–2 proceeds in contact with the capstan CAP with a contact angle of 180°.

By this semi-circular path including two parallel paths of opposite directions, the magnetic tape TP–2 can be transported by the frictional force between the capstan and the tape TP-2 without the use of the pinch roller. In this case the capstan is made of 18–8 stainless steel with its surface sand blasted. The frictional contact with the tape TP–2 is also high due to the 180° bent relation such that only the capstan can transport the tape.

On the other hand, the magnetic tape TP–1 is only in line contact with the capstan as shown in FIG. 3 so that the tape can move with the aid of the pressing action of the pinch roller. Therefore either of the tapes can move assuredly with no slip when both tapes are laminated together. It is understood in FIG. 5 that a much more assured motion of the tapes is effected when the width of the magnetic tape TP–2 is made narrower while that of the tape TP–1 larger.

Each magnetic tape has a recording and playback head and an erase head, respectively. The recording and playback head RPH–1 and the erase head EH–1 are for the out-going magnetic tape TP–1 while the recording and playback head RPH–2 and the erase head EH–2 for the incoming magnetic tape TP–2.

The tapes are disposed as shown in FIG. 3 wherein they move to the direction of an arrow. The tapes TP–1 and TP–2 are of an endless one, respectively, wound on their respective reels in FIG. 3, showing reels MAG–1 and MAG–2, respectively. In transporting the endless tapes, the guide poles, g–1 to g–6 are employed. The tapes have a sufficient length in a neither taut nor slackened condition. To this end, in this invention the tape is spanned in the form of the letter 8 in the reels MAG–1 or MAG–2.

In FIG. 3, the magnetic tape TP–1 paying off from its reel MAG–1 crosses the same tape to be wound around the same reel at the point k in such manner that the tape paying off from the reel lies above the same to be wound around the reel. In the same way, the tape TP–2 paying off from its reel MAG–2 crosses the same tape to be around the same reel at the point k' in such manner that the tape paying off from the reel lies above the same to by taken up by the reel.

In transport, it is very common that the tape immediately after having passed the capstan tends to slack while the one paying off of the reel tends to be taut just before the capstan. In the transport of the endless tape, when there is no slack immediately after the capstan, a smooth rotation will never take place because the tape near the hub of the reel is taut. If the tape is slackened too much, it moves out of the reel. Once removed, the tape cannot be controlled because there is no way to prevent it from entanglement.

In this invention, however, there is no fear that the tapes ride on the hub of the reels or the upper and lower tapes get entangled together, though the tapes should remove out of the reels, because the tape crosses at the point k to thread its way in the form of the letter 8 with being pressed from above at the side where the tape is being paid off. Therefore, the tape can have so excess a length that the friction between the turns thereof can be reduced to minimum. Hence the tape is transported smoothly to reduce its transport power so that the power to drive the capstan will be unexpectedly small. As a result, in general, a smooth transport of the tapes can be attained.

In FIG. 1, a pilot lamp PL–1 is connected to a terminal 5 of the D.C. source in series with a relay A, the other end of which is connected to contact poles CP–1 and CP–2 through a terminal 7. In reference to the contact pole CP–1, when the contact pole CP–1 is bridged on a conductive foil P–1 of the tape TP–1, the relay A is released owing to the momentary deenergization because the terminal 7 is connected to ground. In a similar manner, when the contact pole CP–2 is bridged on a long conductive foil P–2 of the tape TP–2, the relay A is released owing to the deenergization because the terminal 7 is connected to ground. The conductive foil mentioned above is one of the means called, tape contact, which will be described hereinafter.

In FIG. 2, the conductive foil P–1 is short because it is arranged to bridge the contact pole CP–1 only for an instant, then the foil P–1 stops at a distance such that the contact pole CP–1 is not bridged owing to the inertia of the motor. On the other hand, the foil P–2 is long because it is arranged that the foil P–2 is unable to run beyond the contact pole CP–2 even by the inertia of the motor when the foil P–2 bridges the contact pole CP–2 so that the terminal 7 remains grounded. Referring to the input transformer LT–1, the primary winding 107–108 of the input transformer LT–1, is connected to the telephone line, the secondary winding 37 thereof is connected to a transistorized control circuit and to an input terminal of the amplifier AMP–2 having a plurality of transistors, and the tertiary winding 35 thereof is connected to an output terminal of the amplifier AMP–1 having a plurality of transistors.

The telephone answering device of this invention consists essentially of the above-mentioned parts and components.

In operation, when a telephone call is received, a signal of bell ringing is induced from a primary to a secondary winding of an input transformer LT–1 through a capacitor $C_1$, and this signal is applied to the base of the transistor TR–1 from a neutral position of the variable resistor VR–3 through a capacitor $C_2$, and diodes $D_1$, $D_2$.

In this case, owing to a large capacitance of a capacitor $C_3$ into which the signal is charged, and upon the rise of its potential to a predetermined value, the transistor TR–1 turns on so that the potential of the collector thereof is lowered. Hence the transistor TR–2 which has turned on upon energization of the device turns off, which results in a rapid increase of the collector's potential. Then, owing to the presence of a capacitor $C_4$, the base potential of the transistor TR–3 increases for a while so that it turns on, which actuates the relay A inserted into the collector of the transistor TR–3. When the relay A works, it holds itself at its own contact *a*–2 while other contacts *a*–1, *a*–3 and *a*–4 change over to the side opposite to that of FIG. 1. The contact *a*–4 among them turns on so that the capacitor $C_1$ is short-circuited, hence a loop circuit is closed at the primary side of the input transformer LT–1. At this time a capacitor $C_5$ is short-circuited at an absent position of the rotary switch $S_3$ as shown in FIG. 1.

When the contact *a*–1 makes, the motor is energized to transport the tapes so that an answering message from the outgoing tape TP–1 is picked up by the reproducing head RPH–1, from a terminal 109 to a terminal 111 of the rotary switch $S_{3-8}$, through a terminal 107 and a terminal 105 of the rotary switch $S_{3-7}$, from the input terminal 13 of the amplifier AMP–1 to the capacitor $C_{12}$, amplified by the transistors TR–4, TR–5, TR–6, and TR–7, the output of which is transmitted from the terminal 10 of the output transformer T–2 to the terminal 35 of the tertiary winding of the input transformer LT–1 through contacts 92, 94 of the rotary switch $S_{3-4}$ and the capacitor $C_{10}$.

As a result, the output is induced at the primary winding of the input transformer LT–1, and this output is delivered to the telephone line. An answering message is pre-recorded, for example: "This is Hashimoto speaking, 421–2266. I am absent, so your message will be recorded. What is your name, please? . . . " In response to the answering message, the calling party replies: "This is Yamashita speaking". After a while, the outgoing message of the magnetic tape TP–1 speaks: "Please give your message for about 30 seconds". Then, the calling party talks, for example: "I have had an appointment with you at three today, but I will be late due to urgent business. I think I'll come to you at four. Will you wait for me? If you can't, please phone 579–4111". This message is recorded on the tape TP–2. Then, the outgoing tape TP–1 plays back: "You still have 10 seconds longer to record." When the calling party leaves his last message, for example: "This is 411–3596 you have to phone". This can be recorded on the tape TP–2.

Thus, when one cycle of the answering tape TP–1 reaches its final end, the contact pole CP–1 is bridged by the conductive foil P–1 attached to the final end to release the relay. A further call repeats the same steps as described above, and the caller's message will be recorded on the magnetic tape TP–2. How the collar's message is recorded on the tape TP–2 is as follows: in response to the answering message, the caller talks and his voice is transmitted from the input transformer LT–1 through the neutral of the variable resistor VR–4 to a terminal 86 and a terminal 84 of the rotary switch $S_{3-2}$, then from an input terminal 15 of the amplifier AMP-2 through the capacitor $C_{41}$ to the transistor TR–8, the transistor TR–9, the transistor TR–10, and transistor TR–11 to be amplified thereby, and its recording output is delivered from the terminal 20 through a terminal 90 and a terminal 88 of the rotary switch $S_{3-3}$ to the recording and reproducing head RPH–2 to be recorded on the incoming tape TP–2.

At this time, as described before, a part of the energy of the answering message introduced into the teriary winding of the input transformer LT–1 is induced at the secondary winding thereof so that the answering message is to be recorded on the magnetic tape TP–2 before or after the caller's voice. In this case, however, if the input transformer LT–1 is basically the same as that of the primary, secondary, and tertiary coils of a hybrid coil in a telephone set, the delivery of the answering message from the tertiary winding is to the primary winding, and induced at the secondary one at much lower level. Further, the caller's voice from the primary winding is easily induced in the secondary winding.

Thus, as long as the length and volume of the incoming magnetic tape TP–2 permits, the message can be recorded thereon. In this invention, however, five telephone messages or calls a day or one period of absence are selected as a standard for the common family. Both the outgoing tape TP–1 and the incoming tape TP–2 are simultaneously transported by the single capstan and the single pinch roller so that it is arranged by the invention that the outgoing tape is prepared as having a length of one minute per revolution or cycle while that of the incoming tape as having a length of 5 minutes per revolution or cycle. Hence, when the outgoing tape TP–1 receives five calls, the incoming tape TP–2 stops upon termination thereof. The stop of the tape is carried out as follows:

the outgoing tape has a short conductive foil P–1 at the end thereof so that it bridges the contact pole CP–1 to release the relay A, but the foil P–1 goes further owing to the inertia of the motor, hence it is possible to transport the tape at its starting point upon the subsequent call.

When the incoming tape TP–2 reaches its extreme end, the conductive foil P–2 is unable to pass over owing to the inertia of the motor because the foil P–2 is so long that it remains to bridge the contact pole CP–2. As it is clearly shown in FIG. 1, at this time the pilot lamp PL–1 lights so bright that the tape arrives at its final end at a glance. Therefore, in the condition that once the incoming magnetic tape TP–2 reaches its final end and its long conductive foil bridges the contact pole CP–2, the telephone answering device of the invention is in an inoperative condition in response to the telephone call because the D.C. source is connected to ground through the pilot lamp PL–1 so that no energy is supplied from the terminal 5 to the relay A.

In order to reproduce and listen to what is recorded in the above condition when the telephone subscriber comes home, he moves the rotary switch $S_3$ to the listen position and pushes the switch $S_4$ in an instant. Though the relay doesn't function, the motor is energized to transport both tapes so that the incoming tape TP–2 with the conductive foil attached at the end thereof passes over the contact pole CP–2 to turn off the pilot lamp PL–1. This point becomes a starting point of the incoming tape TP–2, and the subscriber pushes the pushbutton $S_2$ in a moment to actuate the relay A, and thereafter listens to what is reproduced by the continuous rotation of the motor M. This is explained as follows: when the tape TP–2 is transported, the reproducing head RPH–2 picks up the signal to transmit it from the input 15 of the amplifier AMP–2 through terminals 88, 91 of the rotary switch $S_{3-3}$, terminals 87, 84 of the rotary switch $S_{3-2}$, the capacitor $C_{41}$, through the transistors, TR–8, TR–9, TR–10, and TR-11 to the speaker from the output terminal 18 to terminals 96, 100 of the rotary switch $S_3$-5.

Then, again, when the magnetic tape TP–2 reaches its final end, the conductive foil P–2 bridges the contact pole CP–2 to stop the motor M as fully described in the foregoing. In order to restore the telephone answering device to the absent or stand-by condition, it is required that the starting point of the tape be in the stand-by condition at the absent position of the rotary switch $S_3$ after passing over the tape end by the actuation of the pushbutton switch $S_4$.

In the preferred embodiment of the invention, if the length of the incoming tape TP–2 is an integer times, for example, five times as long as that of the outgoing tape TP–1, or conversely, the latter is one-fifth, then the conductive foil P–1 attached to the end of the outgoing tape should have passed over the contact pole CP–1.

As clearly shown in FIG. 1, the pushbutton switch $S_4$ consists of a two-gang switch, $S_{4-1}$ and $S_{4-2}$, and the switch $S_{4-2}$ is connected to ground in such manner that it is able to bridge the governor circuit G of the motor M and the choke coil CH for suppressing motor noise. Therefore, when the pushbutton switch $S_{4-2}$ turns on, it means that the micromotor M becomes a series motor which rotates at high speed without the governor G. Thus the tape is transported at a high speed with a continuous push of the pushbutton switch $S_4$. This effect is fully developed when the telephone subscriber comes home and listens if the tape is not exhausted, for example, when two messages were recorded thereon.

In the endless tape, with the transport of the tape in the same direction, the reproduction of the tape is possible from its starting point after one cycle, during which period there is time loss if the tape is transported at normal speed. On the other hand, however, the time loss due to idle feeding can be minimized by transporting the tape at high speed by pushbutton switch $S_4$.

With respect to a switch $S_5$ in FIG. 1, it is disposed between the contact pole CP–2 and the terminal 7 of the relay. Hence, when the switch $S_5$ is on, the stop mechanism of the device functions at the final end of the tape TP–2 while it does not function even at the end of the tape when it is off.

Accordingly, during absence, the tape does not stop at the end of the tape TP–2, but it is controlled by the end of the tape TP–1 or the contact pole CP–1. Thus the tape TP–2 is transported whenever a telephone call is made, and besides, transported at each call in spite of passing over one cycle to record a new message while it erases the pre-recorded one. At a glance it appears it is a fatal defect of the automatic telephone answering device, but it will be an effective benefit in the simple type of the device of the invention, because during a short time service of the device, the starting point of the tape is not always necessary, but in any position of the tape the device will be in the stand-by condition.

Furthermore, as described before, a simultaneous transport of both tapes TP–1 and TP–2 is done so that when the outgoing message is recorded on the tape TP–1 while the tape TP–2 is idly transported, and besides, whenever the telephone subscriber is absent, it is troublesome for the subscriber to put the starting points of both tapes in order. However, if the final end of the tape TP–2 is not engaged, the tape is ready for operation at any position.

In addition, as an electric source, it is understood that a dry cell, storage battery, or a transformer can be employed. In the use of the dry cell, it is required that an electric power should not be consumed to no purpose. To this end, in the device of the invention, it is arranged during the service in the absence that all the amplifiers are not energized. However, when the switch $S_5$ turns on as shown in FIG. 1, the pilot lamp PL–1 continues to light upon termination of the tape TP–2, which results in the consumption of electric current of about 50 milliamperes. This will be fatal if the dry cell is used as an electric source for a pretty long period. Under the circumstances the switch $S_5$ is so selectively employed in an effective manner that it turns off in the use of the dry cell while on in the use of a transformer source. In either case when it turns off, the tape TP–2 never stops. Hence, in case where there is anxiety about the erasure of pre-recorded messages, the tape TP–2 stops when it reaches its end upon actuation of the switch $S_5$ "on". The switch $S_5$ is so provided that it can selectively be employed under the circumstances.

In the preferred embodiment of the invention, the conductive foil and the contact pole are employed as a stop means for the tape. It is understood that similar other means, such as, an assembly comprising a perforated tape and a spring-like fixed electrode which makes contact therewith through the perforation, another assembly comprising a transparent portion provided on the tape, a light source which penetrates the transparent portion, and a photocell, or another assembly in combination with the semiconductor can be employed.

In the stop means comprising the conductive foil and the electrode, a considerable amount of electric current may be consumed in the device of the invention wherein the D.C. source is connected to ground. Where the above current is too heavy under the circumstances, the relay may be released by connecting the base circuit of the transistor to ground in the switching circuit for stop. However, in this case the contact *a*–2 is not connected as in the above example as in FIG. 1.

The relay A holds itself in the state wherein the transistor TR–3 turns on by the contact *a*–2′. Self-holding of the relay is released by the contact pole CP–2′ by connecting the base circuit of the transistor TR–3 to ground.

While the invention has been described in detail with respect to a preferred embodiment of the invention, it will be understood by those skilled in the art after understanding the invention, that various changes and modifications may be made without departing from the spirit and scope of the invention and it is intended to cover all such changes and modifications in the appended claims.

I claim:

1. A telephone answering and recording device which comprises, in combination:

A. a first endless magnetic tape having a predetermined length of about 1 minute per cycle on which outgoing message is recorded, said outgoing message tape being provided with a short tape contact at the end thereof, B. a second endless magnetic tape having a length an integer times as long as that of said first endless tape on which outgoing and incoming messages are recorded, said incoming message tape being provided with a long tape contact at the end thereof, C. the width of each tape being variable, D. a capstan and a pinch roller which transport said first and second magnetic tapes in contact therewith simultaneously, E. a motor for driving said capstan, F. a recording and reproducing head and an erase head exclusively for said outgoing message tape and an amplifier therefor, G. a recording and reproducing head and an erase head exclusively for said incoming message tape and an amplifier therefor, H. an input transformer provided with a plurality of windings, and receiving a signal from the telephone line and transmitting a voice signal to the telephone line simultaneously, I. a relay provided with a plurality of contacts, J. a transistor switch actuated by the diodes rectifying a ringing signal induced to the secondary winding from the primary winding of said input transformer, said switch being disposed on said relay, K. an electric source for energizing said motor, said relay, and said two amplifiers, L. a pilot lamp connected in series to the coil of said relay and indicating a plurality of functions, M. means to make a closed circuit of the telephone line through a contact actuated upon the energization of said relay and a primary winding of said input transformer, N. means to transmit an output derived from said amplifier for the outgoing message to a tertiary winding of said input transformer, O. means to transmit an input derived from a secondary winding of said input transformer to said amplifier for the incoming message, P. a plurality of manual switches, Q. contact means to constitute a ground circuit of said pilot lamp in response to said short tape contact provided on said outgoing message tape, and R. means to render said transistorized control circuit inoperative in response to said long tape contact provided on said incoming message tape.

2. In a telephone answering and recording device as claimed in claim 1 wherein said means to render said transistorized control circuit inoperative or operative is connected to a manually operative switch.

3. In a telephone answering and recording device as claimed in claim 1 wherein a manual switch consisting of two elements is provided, one of said elements is to re-start said incoming message tape upon the termination of said tape at the end thereof, and the other of said elements is operatively connected to said former element, whereby a governor circuit of a D.C. motor is bridged when said manual switch is made ON.

4. In a telephone answering and recording device as claimed in claim 1 wherein there is a pilot lamp connected in series between said relay coil and said electric source, said pilot lamp lights dim during the operation of said relay, said pilot lamp lights bright for a moment at the end of said outgoing message tape, and said pilot lamp lights bright continuously after the stop of said incoming message tape.

5. In a telephone answering and recording device as claimed in claim 1 wherein said second endless incoming magnetic tape is caused to follow a semi-circular path in contact with said capstan including two parallel paths of opposite direction by a plurality of guide posts, each of said two magnetic tapes is caused to follow a path in the form of the letter 8 with its respective reel as its own head, and said first tape lies over said second tape upon said capstan so as to keep a linear contact with said capstan by means of said pinch roller.

6. In a telephone answering and recording device as claimed in claim 1, said first tape is arranged side by side with said second tape in an upper and lower relation.

7. In a telephone answering and recording device as claimed in claim 1, said incoming message tape has a width one-half that of said outgoing message tape and said two tapes are transported simultaneously in a laminated form along their center lines between said capstan and said pinch roller in contact therewith.

* * * * *